2,762,744

PIPERAZINE DERIVATIVES, PRODUCTION THEREOF AND SUPPOSITORIES COMPRISING THE SAME

René Hazard, Jean Cheymol, Pierre Chabrier, and Jean E. Thuillier, Paris, France, assignors to Les Laboratoires Bruneau & Cie (Société à Responsabilité limitée), Paris, France, a company of France No Drawing. Application August 24, 1951,
Serial No. 243,592

9 Claims. (Cl. 167—64)

This invention relates to new derivatives of piperazine and the production thereof.

It is an object of this invention to provide new derivatives of piperazine which may be employed as intermediate products for the synthesis of other substances, and also partly as parasiticides, particularly as anthelminthic medicines.

A more specific object is to provide a new type of curarizing agents having a relatively low toxicity for use in therapeutics, particularly in surgery.

Another object is to provide a new type of curarizing agents capable of securing a protracted effect when administered as components of suppositories.

Further objects will become apparent as the specification proceeds.

According to this invention, we provide new piperazine derivatives in which a lower aliphatic hydrocarbon group bridges each nuclear nitrogen atom of a piperazine compound with a tertiary or quaternary extranuclear nitrogen atom. Amongst such derivatives, we have found that the N.N'-bis-(di-lower-alkyl-amino-lower alkyl)-piperazine, N.N'-bis-(piperidyl-lower alkyl)-piperazines and N.N'-bis-(morpholyl-lower-alkyl)-piperazines in which the extranuclear amino groups are remote from, preferably in ω-position with respect to, the nuclear nitrogen atoms, are particularly desirable, as well as quaternary compounds thereof.

More particularly, our invention comprises N.N'-bis-(β-diethylamino-ethyl)-piperazine, N.N' - bis - (β - dimethyl amino-ethyl)-piperazine, N.N'-bis-(β-morpholyl - ethyl)-piperazine, N.N'-bis-(β-piperidyl-ethyl)-piperazine, and the di-iodo-methylates and di-iodo-ethylates thereof. The di-iodo-ethylate of N.N'-bis-(β-piperidyl-ethyl)piperazine is particularly valuable.

Up to this time, natural or synthetic curarizing agents have been administered intravenously, whether in surgery or psychiatry before electroshocks, to cause a muscular relaxation, whereby electroshocks can be effected without any danger, or surgical operations are facilitated.

A few attempts were made to administer curarizing agents at dose levels which are below that required to produce complete muscular paralysis, but are high enough to suppress painful contractures in certain affections, in neurology, gynecology or obstetrics.

Some curarizing agents have also been administered perorally and others have been injected subcutaneously in carriers consisting of wax and oil mixtures.

In any case, it has not been possible to secure a sufficiently protracted effect. Furthermore, difficulties have been experienced by reason of which the use of curarizing agents has been restricted up to this time.

It is a further object of our invention to provide new curarizing compositions whereby the difficulties above set forth are removed and a protracted sedative effect is obtained.

According to that aspect of the invention, we provide curarizing compositions which comprise the combination of a piperazine derivative as above defined, with a suppository vehicle or carrier.

More particularly, this invention comprises a curarizing composition to be administered in the form of a suppository, which comprises N.N'-bis-(β-piperidyl-ethyl)-piperazine di-iodoethylate in combination with a suppository vehicle or carrier such as cocoa-butter or Carbowax 4000. Alternatively N.N'-bis-(β-diethylamino-ethyl)-piperazine di-iodoethylate may be substituted for N.N'-bis-(β-piperidyl-ethyl)-piperazine di-iodoethylate, although the latter piperazine derivative is preferred.

For preparing the new piperazine derivatives, piperazine or piperazine hydrate may be condensed with a suitable tertiary-amino alkyl halide; it is desirable to effect the reaction in a solvent for piperazine such as alcohol in which the hydrohalide is not soluble and can thus be collected as a precipitate. The quaternary compounds may be prepared in a conventional manner, for example by causing alkylating agents to react directly with the di-tertiary base.

A different procedure may also be adopted which is more convenient in certain cases. It comprises reacting a hydroxy lower alkyl halide (or glycol mono halo-hydrin) with piperazine to produce a N.N'-bis (hydroxy-lower alkyl)-piperazine, then reacting said N.N'-bis-(hydroxy-lower-alkyl)-piperazine with a halogenating agent to substitute halogen atoms for the hydroxy-groups, and finally reacting the N.N'-bis-(halogeno-lower alkyl)-piperazine or a salt thereof such as the dihydrochloride with a suitable secondary amine.

The following examples are illustrative of our invention.

*Example 1.*—194 parts by weight of piperazine having 6 molecules of hydration water were dissolved in 400 parts by volume of 95 per cent alcohol; the solution was cooled in ice and 271 parts by weight (i. e. a double molar proportion) of β-diethylamino ethyl chloride were gradually added thereto. The reaction proceeded quickly and N.N'-bis-(β-diethylamino ethyl)-piperazine hydrochloride gradually precipitated.

The reaction mixture was left for 48 hours, after which the precipitate was filtered on a Büchner filter, the filtrate distilled for recovery of alcohol, and the residue mixed with the hydrochloride collected on the filter. The mixture was dissolved in about 300 parts of water, and the polyamine set free by adding an excess of caustic soda solution having a strength of 36° Bé. The base thus set free formed a supernatant layer. It was decanted and rectified at atmospheric pressure. Its boiling point was 320° C. under atmospheric pressure and 220° C. under a pressure of 42 mm. of mercury.

The formula of the base was found to be

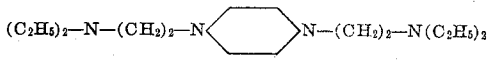

The base is very readily soluble in water (from which it may be separated for example by alkalis and salts in aqueous solution), alcohol, ether, benzene, acetone and chloroform. It can be titrated by alcalimetric process in the presence of phenol phthalein; it is found to behave as a dibasic substance; it readily yields water soluble salts with inorganic and organic acids.

By the same process but with substitution of β-dimethylamino ethyl chloride for β-diethylamino-ethyl chloride, N.N'-bis-(β-dimethylamino-ethyl)-piperazine was easily obtained.

*Example 2.*—We worked as described in Example 1, employing β-morpholyl ethyl chloride instead of β-diethylamino ethyl chloride in the same proportion. The reaction was less violent and it was not necessary to control it by means of a cooling mixture.

The base obtained was solid at room temperature; it was less soluble in organic solvents and could be purified by recrystallizing out of acetone. Its formula is

The melting point is 90° C. and the boiling point 250° C. under a pressure of 18 mm. Hg. It is fairly soluble in water out of which it can be precipitated; it is only slightly soluble in cold acetone but more readily soluble in warm acetone. It readily gives water soluble salts with inorganic and organic acids.

*Example 3.*—1 mol of N.N'-bis-(β-diethylamino-ethyl)-piperazine was dissolved in an excess of dry ether; 2.5 mols of methyl iodide were added and allowed to react; the di-iodomethylate of the base was formed rapidly. After 48 hours, the precipitated quaternary salt was separated, washed with ether and dried.

The diiodomethylate melts at 270° C. with decomposition and is soluble in water but insoluble in organic solvents.

N.N'-bis-(β-dimethylamino-ethyl)-piperazine diiodomethylate was easily prepared by the same procedure.

*Example 4.*—We worked as described in Example 3, substituting ethyl iodide for methyl iodide; the reaction took place much more slowly and precipitation was complete only after several days.

N.N' - bis - (β - diethylamino - ethyl) - piperazine diiodoethylate melts at 225° C. with decomposition; it is soluble in water but insoluble in organic solvents.

N.N' - bis - (β - dimethylamino - ethyl) - piperazine diiodoethylate was prepared by the same procedure.

*Example 5.*—We worked as described in Example 3, employing methyl iodide and N.N'-bis-(β-morpholyl-ethyl)-piperazine as starting materials; however by reason of the poor solubility in ether, we chose acetone as a solvent. A precipitate of diiodomethylate was formed almost immediately. The diiodomethylate melts at 250° C. with decomposition. It is soluble in water but insoluble in organic solvents.

*Example 6.*—We worked as described in Example 5, substituting ethyl iodide for methyl iodide; the production of N.N'-bis-(β-morpholyl-ethyl)-piperazine diiodoethylate took place much more slowly. The diiodoethylate has a melting point of 185° C.; it is soluble in water but insoluble in organic solvents.

*Example 7.*—With a view to preparing N.N'-bis-(β-dimethylamino-ethyl)-piperazine by another procedure than illustrated by Example 1, we produced successively:

(a) N.N'-bis-ethanol-piperazine.

Two mols of glycol monochlorhydrin were reacted with one mol of piperazine in alcoholic medium; N.N'-bis ethanol-piperazine was thus obtained with a yield of 65-70%; after purification through distillation, it had a melting point of 134° C.

(b) N.N'-bis-(β-chlorethyl)-piperazine dihydrochloride.

4 mols of thionyl chloride were reacted with one mol of N.N'-bis-ethanol-piperazine in benzenic medium, when the reaction was completed, the reaction product was distilled to remove benzene and excess thionyl chloride. The residual dihydrochloride was then washed with alcohol and benzene and was obtained as a hygroscopic, slightly brown compound.

4 mols of dimethylamine in alcoholic solution and one mol of N.N'-bis-(β-chlorethyl)-piperazine dihydrochloride were then heated in a sealed tube for 4 hours on the water bath. Thereafter, the alcoholic solution was evaporated to dryness in the presence of sodium carbonate, extracted with ether, and the ether solution rectified to purify N.N' - bis - (β - dimethylamino - ethyl) - piperazine which exhibited a boiling point of 205° C. under a pressure of 40 mm. Hg.

*Example 8.*—By the same procedure but substituting diethylamine for dimethylamine, we obtained with a good yield N.N'-bis-(β-diethylamino-ethyl)-piperazine boiling at 220° C. under a pressure of 32 mm. of mercury.

*Example 9.*—By the same procedure as in Example 7 but substituting piperidine for dimethylamine, we obtained N.N'-bis-(β-piperidyl-ethyl)-piperazine of the formula

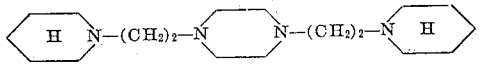

The base has a melting point of 80° C. and may also be produced by condensing piperazine or the hydrate thereof with β-piperidyl-ethyl chloride, according to the first process herein set forth.

*Example 10.*—One mol of N.N'-bis-(β-diethylamino-ethyl)-piperazine was dissolved in a slight excess of dry acetone, 3 mols of methyl bromide were added thereto, and the acetonic solution was heated in a sealed tube for 4 hours on the water-bath.

N.N'-bis-(β-diethylamino-ethyl)-piperazine dibromomethylate precipitated on cooling; its melting point is 210° C.

*Example 11.*—One mol of N.N'-bis-(β-piperidylethyl)-piperazine was dissolved in an excess of dry acetone, and 3 mols of methyl iodide were added thereto. After 24 hours' standing in the cold, there was formed N.N'-bis-(β-piperidyl-ethyl)-piperazine diiodomethylate

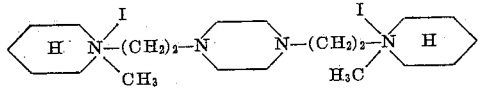

having a melting point of 280° C.

*Example 12.*—By the same procedure as in Example 11 but substituting ethyl iodide for methyl iodide in equimolecular amount, we obtained N.N'-bis-(β-piperidyl-ethyl)-piperazine diiodoethylate

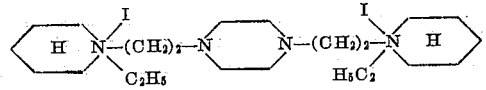

having a melting point of 215° C.

*Example 13.*—In acetonic or ethereal medium, 3 mols of methyl iodide were reacted as above with 1 mol of N.N'-bis-(β-dimethylamino-ethyl)-piperazine. We thus obtained the diiodomethylate already referred to in Example 3.

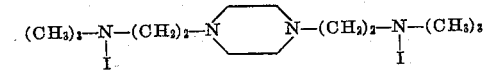

having a melting point of 230° C.

The quaternary ammonium derivatives disclosed in the above examples were found to have curarizing properties when administered in aqueous solution. We have further found that a new mode of administration of the above curarizing agents, viz. the suppository form, is particularly efficient.

As examples, we prepared and administered suppositories of the following composition:

| | |
|---|---|
| N.N'-bis - (β - piperidyl - ethyl)-piperazine diiodoethylate. | 0.50 g. |
| Cocoa butter | Usual amount for one suppository. | and

| | |
|---|---|
| N.N'-bis - (β - piperidyl - ethyl)-piperazine diiodoethylate. | 0.50 g. |
| Polyethylene-glycol (Carbowax 4000). | Usual amount for one suppository. |

Administered at the above dose level, the diiodoethylate afforded a protracted sedation of painful contractures which are met in some paraplegias and in tetanus. Much more important and unknown as yet, are the results obtained in psychiatry in cases of anxiety. More than a hundred patients exhibiting anxiety to various extents including cases which could be treated only with electroshocks were relieved by suppositories to a surprising degree. In a few minutes the patient is soothed and the period of quiet lasts for half a day or more. The therapeutics may be resumed without any inconvenience.

About ten patients were also treated with the above-described suppositories in cases of spasmodic colics and gastro-intestinal derangements of spasmodic origin. The results were excellent and confirmed by radiology.

Finally in gynecology and obstetrics, in cases of curettings and confinements, forty women were treated with full success: easy uterine dilatation, easy delivery of foetus or child, simplified manipulations and smooth sequelae.

It is thus believed that we have provided a new series of curarizing agents, the effects of which are different from those of conventional curarizing agents, and which are desirable for cases for which no equivalent had been available as yet.

What we claim is:

1. N.N'-bis-(β-piperidyl-ethyl)-piperazine, of the formula

2. N.N'-bis-(β-piperidyl-ethyl)-piperazine diiodoethylate of the formula

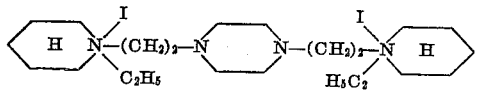

3. A suppository which comprises N.N'-bis-(β-piperidyl-ethyl)-piperazine diiodoethylate and a suppository carrier.

4. N.N'-bis-(β-diethylamino-ethyl)-piperazine of the formula

5. N.N'-bis-(β-diethylamino-ethyl)-piperazine diiodoethylate of the formula

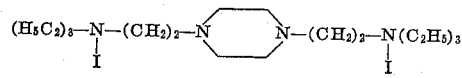

6. A suppository which comprises N.N'-bis-(β-diethylamino-ethyl)-piperazine diiodoethylate and a suppository carrier.

7. A suppository which comprises a di-(halogeno-lower-alkylate) of a N.N'-bis-(β-tertiaryamino-ethyl)-piperazine, in which the tertiary amino group is selected from the class of dimethylamino, diethylamino, piperidyl and morpholyl groups, and the halogeno is selected from the class of iodo- and bromo-, and a suppository carrier.

8. A process for the production of a N.N'-bis-(β-tertiary-amino-lower-alkyl)-piperazine di-(halogeno-lower-alkylate), which comprises quaternizing a N.N'-bis-(β-tertiary-amino-lower-alkyl)-piperazine in which the tertiary amino group is selected from the class consisting of dimethylamino, diethylamino, piperidyl and morpholyl groups, in organic medium, by means of a lower alkyl halide selected from the class consisting of lower alkyl iodides and lower alkyl bromides.

9. A compound selected from the class consisting of (1) N.N' - bis(tertiary - amino - lower -alkyl)-piperazines wherein the tertiary amino group is selected from the class consisting of dimethylamino, diethylamino, piperidyl and morpholyl groups, and (2) di-(halogeno-lower-alkylates) of (1) wherein the halogeno is selected from the class consisting of iodo- and bromo.

References Cited in the file of this patent

McIntyre: Curare, University of Chicago Press, Chicago, Ill., 1947, p. 153.

Hazard et al.: Arch. Intern. Pharmacodynamie, 84, 237–56.